(12) United States Patent
Fortin

(10) Patent No.: US 9,132,721 B2
(45) Date of Patent: Sep. 15, 2015

(54) VEHICLE DOOR AND DOOR MODULE

(71) Applicant: Magna Closures Inc., Newmarket (CA)

(72) Inventor: Raymond Edward Fortin, Newmarket (CA)

(73) Assignee: Magna Closures Inc., Newmarket (CA)

( * ) Notice: Subject to any disclaimer, the term of this patent is extended or adjusted under 35 U.S.C. 154(b) by 0 days.

(21) Appl. No.: 14/093,137

(22) Filed: Nov. 29, 2013

(65) Prior Publication Data

US 2014/0117706 A1   May 1, 2014

Related U.S. Application Data

(63) Continuation of application No. PCT/CA2012/000527, filed on May 30, 2012.

(60) Provisional application No. 61/491,285, filed on May 30, 2011.

(30) Foreign Application Priority Data

May 30, 2012   (WO) ................ PCT/CA2012/000527

(51) Int. Cl.
  *B60J 5/04* (2006.01)
  *B60J 5/06* (2006.01)
  *E05B 79/04* (2014.01)
  *E05B 83/40* (2014.01)
  *E05F 11/48* (2006.01)
  *E05B 63/14* (2006.01)
  *E05B 81/20* (2014.01)

(52) U.S. Cl.
  CPC ................ *B60J 5/0416* (2013.01); *B60J 5/042* (2013.01); *B60J 5/0418* (2013.01); *B60J 5/06* (2013.01);

(Continued)

(58) Field of Classification Search
  CPC ...... B60J 5/0416; B60J 5/045; B60R 21/0428
  USPC ......... 296/152, 146.6, 146.5, 146.16; 49/349, 49/352, 501, 502, 348
  See application file for complete search history.

(56) References Cited

U.S. PATENT DOCUMENTS 4,882,842 A  * 11/1989  Basson et al. ................... 29/857
5,226,259 A  *  7/1993  Yamagata et al. .............. 49/502

(Continued)

FOREIGN PATENT DOCUMENTS

DE     102006053458 A1   5/2008
EP        1652706 A1    5/2006

OTHER PUBLICATIONS

International Search Report dated Aug. 17, 2012 issued by the Canadian Intellectual Property Office relating to PCT International Application No. PCT/CA2012/000527.

(Continued)

*Primary Examiner* — Glenn Dayoan
*Assistant Examiner* — Sunsurraye Westbrook
(74) *Attorney, Agent, or Firm* — Grant Tisdall; Gowling Lafleur Henderson LLP

(57) ABSTRACT

In an example, a vehicle door module has a carrier carrying a plurality of functional door hardware components. The carrier defines a wet side facing towards a door cavity and a dry side facing away from the door cavity. The door includes an inner door panel having a front pocket and a rear pocket. The carrier includes front and rear latch presenters and carries front and rear door latches on the dry side thereof which seat in the front and rear door pockets. The latches are connected to reinforcement plates which are connected by fasteners at positions surrounding the door pockets thus enabling each latch to be easily accessed for service by simply removing the corresponding reinforcement plate, which may be located under an easily removed interior trim panel.

18 Claims, 11 Drawing Sheets

(52) U.S. Cl.
CPC ................ *E05B 79/04* (2013.01); *E05B 83/40* (2013.01); *E05B 63/143* (2013.01); *E05B 81/20* (2013.01); *E05F 11/488* (2013.01); *E05Y 2201/684* (2013.01); *E05Y 2800/29* (2013.01); *E05Y 2900/55* (2013.01)

(56) References Cited

U.S. PATENT DOCUMENTS

| | | | |
|---|---|---|---|
| 5,308,138 A * | 5/1994 | Hlavaty | 296/146.6 |
| 5,902,004 A | 5/1999 | Waltz et al. | |
| 6,546,674 B1 | 4/2003 | Emerling et al. | |
| 6,854,785 B2 * | 2/2005 | Simon et al. | 296/146.7 |
| 7,797,882 B2 * | 9/2010 | Lubaway | 49/352 |
| 7,854,466 B2 * | 12/2010 | Blackmer et al. | 296/152 |
| 2005/0075226 A1 | 8/2005 | Lin et al. | |
| 2006/0000082 A1 | 1/2006 | Roy et al. | |

OTHER PUBLICATIONS

Supplementary European Search Report dated Aug. 26, 2014 issued from the European Patent Office relating to European Patent Application No. 12793869.4.

\* cited by examiner

VEHICLE DOOR AND DOOR MODULE

CROSS-REFERENCE

This application is a Continuation Application of PCT International Application No. PCT/CA2012/000527, filed May 30, 2012, which claims the benefit of U.S. Provisional Application No. 61/491,285, filed May 30, 2011, the contents of which are incorporated herein in their entirety.

FIELD

This disclosure relates generally to vehicle doors and door modules and more particularly to a vehicle door and a door module that carries a latch for the vehicle door.

BACKGROUND

In a door module, a variety of functional door hardware components are pre-assembled onto a plate or some other form of carrier so that these components can all be loaded into a vehicle door at one time on the vehicle assembly line and save assembly steps. Examples of door modules are disclosed in U.S. Pat. No. 5,902,004, U.S. Pat. No. 8,020,919, U.S. Publication No. 2011/0308163, and PCT Publication No. 2008/138122.

It is also known to utilize a door module for a sliding vehicle door such as found in passenger minivans. However, some door modules for sliding vehicle doors do not include components such as locking mechanisms. Instead, the locking mechanisms are separately installed within the door cavity, making the locking mechanisms difficult to service, as the entire module must be removed in order to access the locking mechanisms.

SUMMARY

In an aspect, a sliding vehicle door is provided. The sliding vehicle door includes an outer door panel and an inner door panel joined to the outer door panel so as to define a door cavity between the inner and outer door panels. The inner door panel has an aperture providing access to the door cavity. A door module including a carrier carrying a plurality of functional door hardware components is mounted to the inner door panel to seal the aperture. The carrier defines a wet side of the door module facing towards the door cavity and a dry side of the door module facing away from the door cavity. The inner door panel includes a front pocket positioned adjacent a front edge of the inner door panel and extending towards the outer door panel. The inner door panel further includes a rear pocket positioned adjacent a rear edge of the inner door panel and extending towards the outer door panel. The carrier includes a front latch presenter positioned to at least partially seat in the front pocket. The carrier further includes a rear latch presenter positioned to at least partially seat in the rear pocket. The door module includes a front latch that is carried by the front latch presenter on the dry side of the door module so as to be at least partially seated in the front pocket. The door module includes a rear latch that is carried by the rear latch presenter on the dry side of the door module so as to be at least partially seated in the rear pocket.

In the foregoing manner, the front and rear latches are no longer located in the door cavity but instead both latches are located in more easily accessible places.

The front latch presenter may include a shroud having an outer wall and top and bottom walls, with the front latch being positioned on the front latch presenter such that the shroud outer wall lies between the front latch and the inner door panel front pocket. The front latch presenter shroud may be impervious to water and electrical connections may be made to the front latch within the front latch presenter shroud. The front latch presenter may be integrally formed with the carrier.

Likewise, the rear latch presenter may include a shroud having an outer wall and top and bottom walls, with the rear latch being positioned on the rear latch presenter such that the shroud outer wall lies between the rear latch and the inner door panel rear pocket. The rear latch presenter shroud may be impervious to water and electrical connections may be made to the rear latch within the rear latch presenter shroud. The rear latch presenter may also be integrally formed with the carrier.

A front latch reinforcement plate may be connected to the front latch, and the front latch may be connected to the inner door panel by connecting the front latch reinforcement plate to the inner door panel with fasteners at positions outside the front pocket and outside of the front latch. The front latch reinforcement plate may include a first wall and an adjoining side wall transversely oriented to the first wall, and the inner door panel may include a longitudinal wall that is supported by the front latch reinforcement plate side wall.

Likewise, a rear latch reinforcement plate may be connected to the rear latch, and the rear latch may be connected to the inner door panel by connecting the rear latch reinforcement plate to the inner door panel with fasteners at positions outside the rear pocket and outside of the rear latch. The rear latch reinforcement plate may include top, bottom and side wings that respectively attach to points above, below and to the side of the rear pocket.

In the foregoing manner, the front or rear latch can be easily accessed for service by simply removing the corresponding reinforcement plate, which may be located under an easily removed interior trim panel.

At least one of the front and rear latch presenters may include slots positioned on the dry side of the door module for routing at least one cable or wire connected to the latch carried by the at least one of the front and rear latch presenters. At least one of the front and rear latch presenters may also include a web portion along which the at least one cable or wire travels along the dry side of the door module, and a cover may cover the web portion.

An inside handle may be mounted to the dry side of the carrier and operatively connected to the front and rear latches.

At least one of the front and rear latches may be a cinching latch.

The door module may include a window regulator including drive cable and a cable drum positioned on the wet side of the carrier and a motor positioned on the dry side of the carrier and operatively connected to the cable drum through an aperture in the carrier. The wet side of the carrier may incorporate a network of channels in which the drive cable runs. The window regulator may include at least one lift bracket connected to the drive cable and the wet side of the carrier may include at least one integrally formed rail guiding the at least one lift bracket.

At least one glass run channel may be mounted separately to the inner door panel for guiding edges of a window.

In another aspect a vehicle door is provided which may be a sliding vehicle door, or which may be another kind of door, such as a hinged vehicle door. The vehicle door includes an outer door panel, an inner door panel joined to the outer door panel, and a door module including a carrier carrying a plurality of functional door hardware components mounted to the inner door panel. The carrier includes a latch presenter positioned to at least partially seat in a pocket on the inner door panel. The door module includes a latch carried by the latch presenter. A latch reinforcement plate is connected to the latch, and is connected to the inner door panel by a plurality of fasteners at positions outside of the latch.

In yet another aspect, a vehicle door is provided which may be a sliding vehicle door, or which may be another kind of door, such as a hinged vehicle door, which includes a an outer door panel, an inner door panel joined to the outer door panel, and a door module including a carrier carrying a plurality of functional door hardware components mounted to the inner door panel, and wherein the carrier includes a latch presenter positioned on a dry side of the door module and positioned to at least partially seat in the pocket, wherein the latch presenter is integral with the carrier and made from a polymeric material. The door module includes a latch carried by the latch presenter on the dry side of the door module so as to be at least partially seated in a pocket on the inner door panel. The door module further includes a latch reinforcement plate covering the latch. The latch reinforcement plate is connected to the inner door panel by a plurality of fasteners.

BRIEF DESCRIPTION OF THE DRAWINGS

The foregoing and other aspects will now be described by way of example only with reference to the attached drawings, in which.

DETAILED DESCRIPTION

Figure 1:
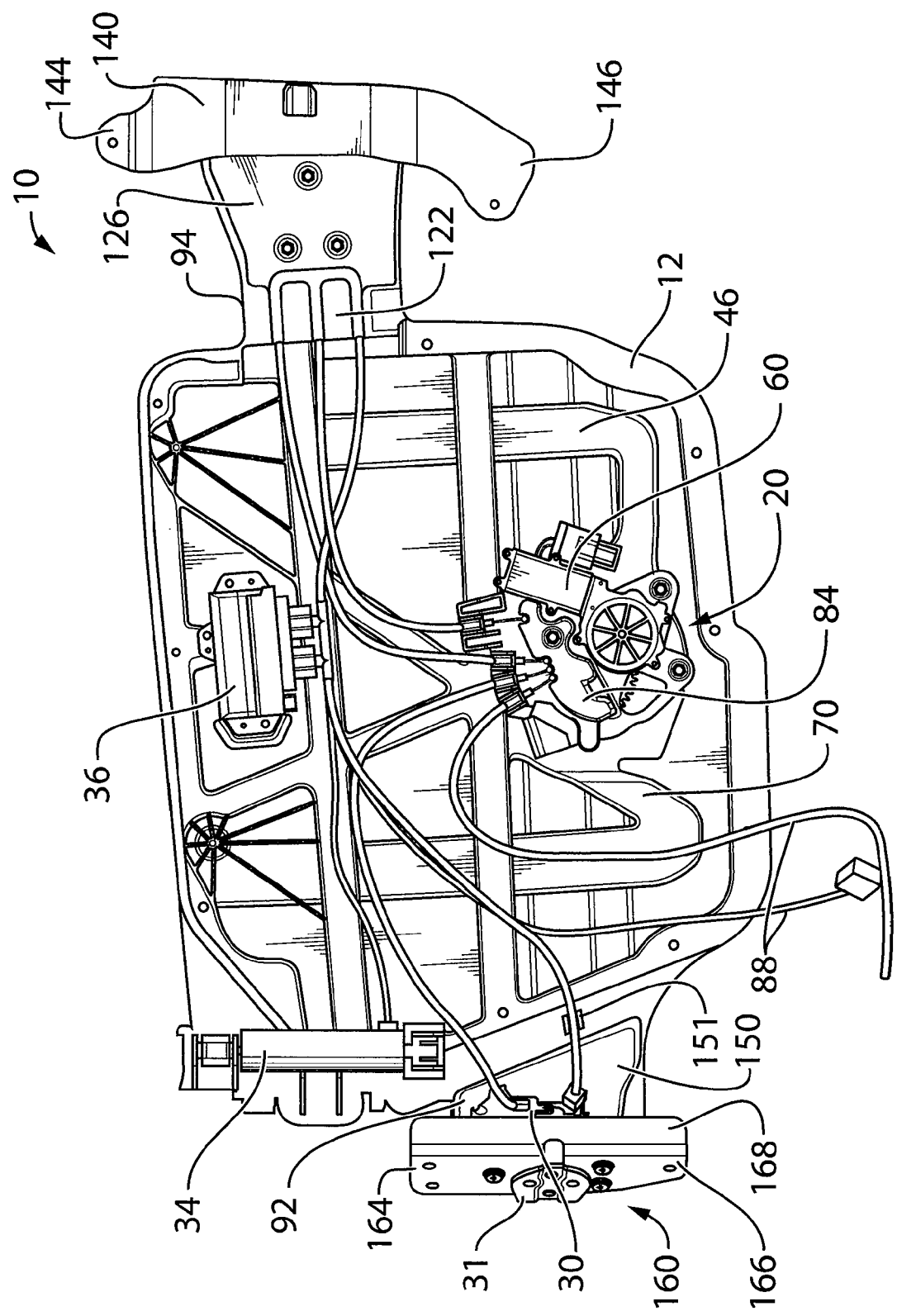
FIG. 1 is a plan view of a first side of a door module.
Figure 2:
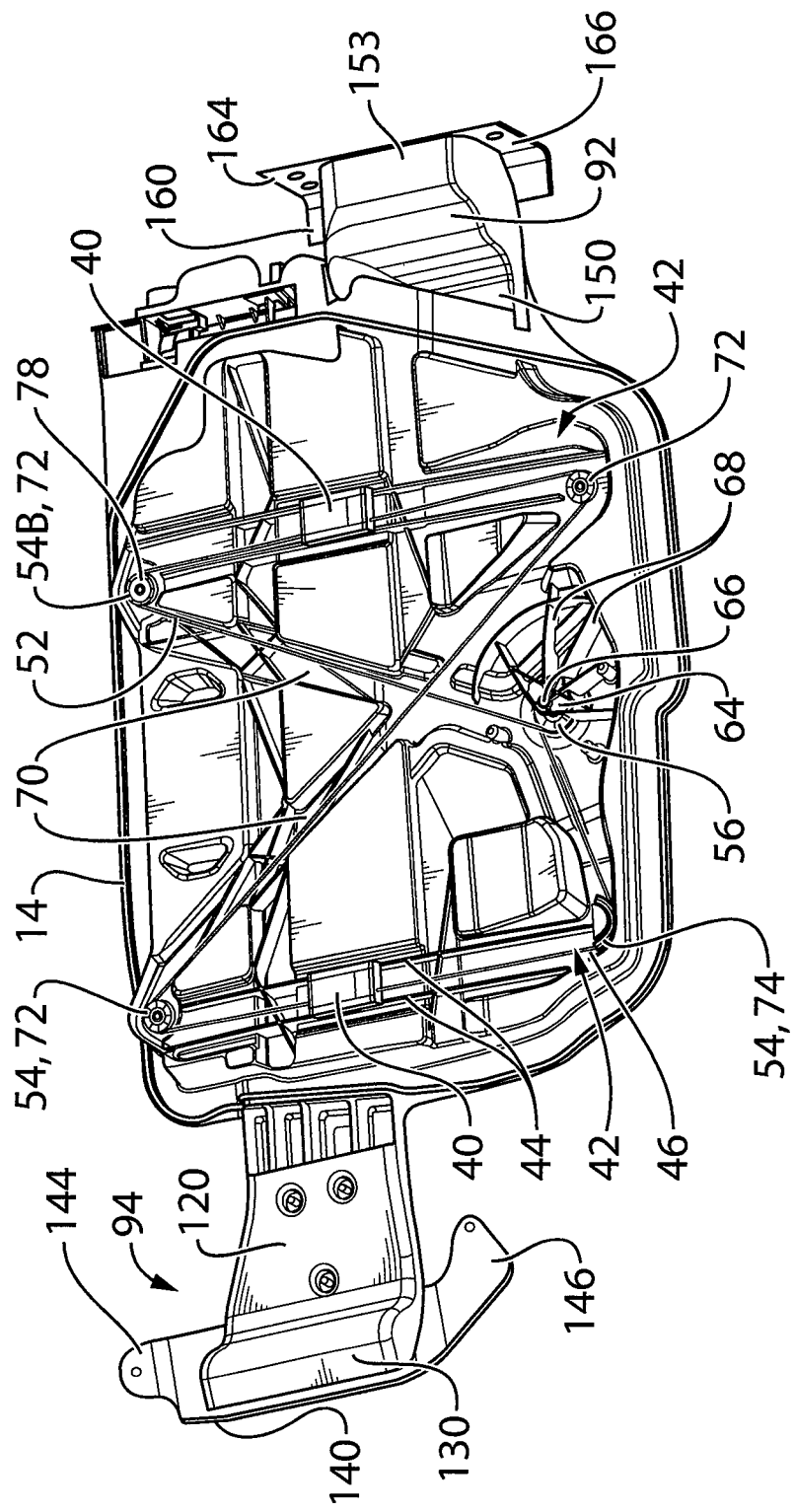
FIG. 2 is a plan view of a second side (opposite the first side) of the door module shown in FIG. 1.

FIG. 1 shows a first side of a door module 10 and FIG. 2 shows a second side of the door module 10, the second side being opposite to the first side. The first side of the door module 10 seen in FIG. 1 may be referred to in this document as the "dry side" because, as discussed in greater detail below, when the door module 10 is installed in a vehicle door, the door module 10 seals the passenger compartment against the ambient environment such that the first side, which faces towards the passenger compartment, is protected from the environment and remains dry. Similarly, the second side of the door module 10 seen in FIG. 2 may be referred to in this document as the "wet side" because when the door module 10 is installed in a vehicle door the second side of the door module 10 faces outwardly, away from the passenger compartment, and may be exposed to the ambient environment as a result of apertures in the vehicle door (such as the large slot through which a window moves between opened and closed positions).

The door module 10 includes a carrier 12, which is generally plate-like in configuration, although it will be understood that the carrier 12 has a variety of integrally formed three dimensional features as discussed in greater detail below. The carrier 12 holds a variety of functional door hardware components so as to minimize the handling of individual door components and reduce assembly time by aligning at one time multiple door hardware components to the installation positions of the door hardware components. The carrier 12 may be structural in the sense that the door hardware components may be mounted on the carrier 12 without requiring additional fasteners to mount the door hardware components to the vehicle sheet metal once the carrier 12 is mounted in the vehicle door. Alternatively, the carrier 12 may be non-structural such that additional fasteners are needed to mount the door components to the vehicle sheet metal after the carrier 12 is mounted to the vehicle door. The carrier 12 may alternatively be semi-structural, enabling some door hardware components to be mounted solely to the carrier 12 and requiring other door hardware components that are subject to greater stress to be additionally fastened to the vehicle sheet metal. The carrier 12 as shown in FIGS. 1 and 2 is semi-structural as will be apparent from the description that follows. The carrier 12 may be manufactured from structural or non-structural resin (or any other suitable polymer) and formed using an injection moulding process as known in the art. Alternatively, the carrier 12 may be formed from other materials such as metal in a "super plastic" forming process as known in the art. Other known manufacturing methods are also possible.

Figure 4:
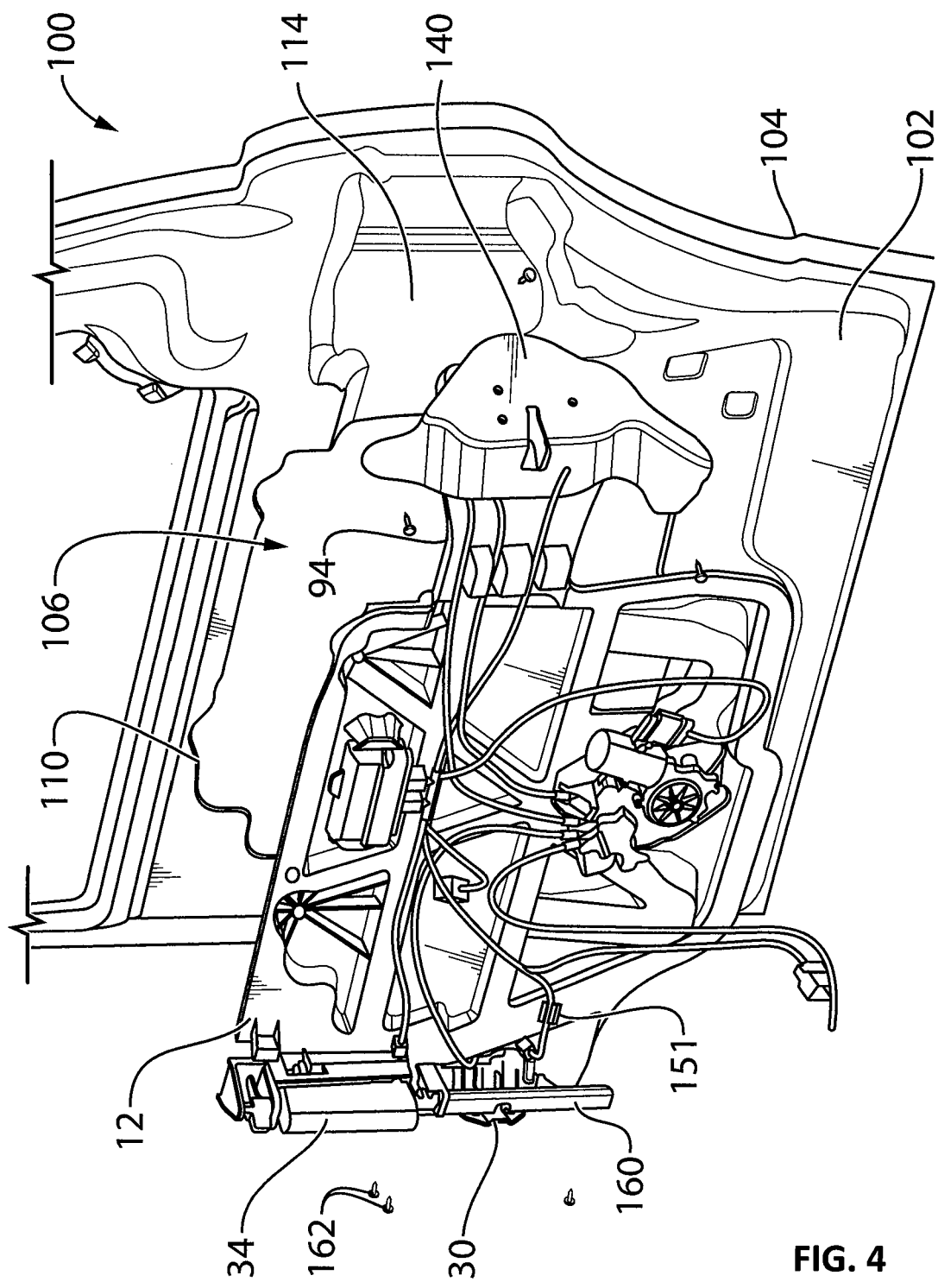
FIG. 4 is a perspective view of the door module shown in FIG. 1 in the process of being mounted to an inner panel of a vehicle sliding door.

Referring additionally to FIG. 4, the door module 10 illustrated in the drawings is configured for installation to a sliding vehicle door 100 having a window 108 that moves up and down as is popular in late model minivans. The sliding vehicle door 100 includes an inner door panel 102 joined to an outer door panel 104 at the peripheries of the inner and outer door panels 102, 104 so as so to define a door cavity 106 between the inner and outer door panels 102, 104. The inner door panel 102 may be made from sheet metal and may in such circumstances be referred to as an inner sheet metal layer 102. The outer door panel 104 may be made from sheet metal and may in such circumstances be referred to as an outer sheet metal layer. The outer door panel 104 is schematically illustrated by a silhouette line.

The window 108 is stored in the door cavity 106 when the window 108 is opened. The inner door panel 102 includes an aperture 110 providing access to the door cavity 106.

Figure 10:
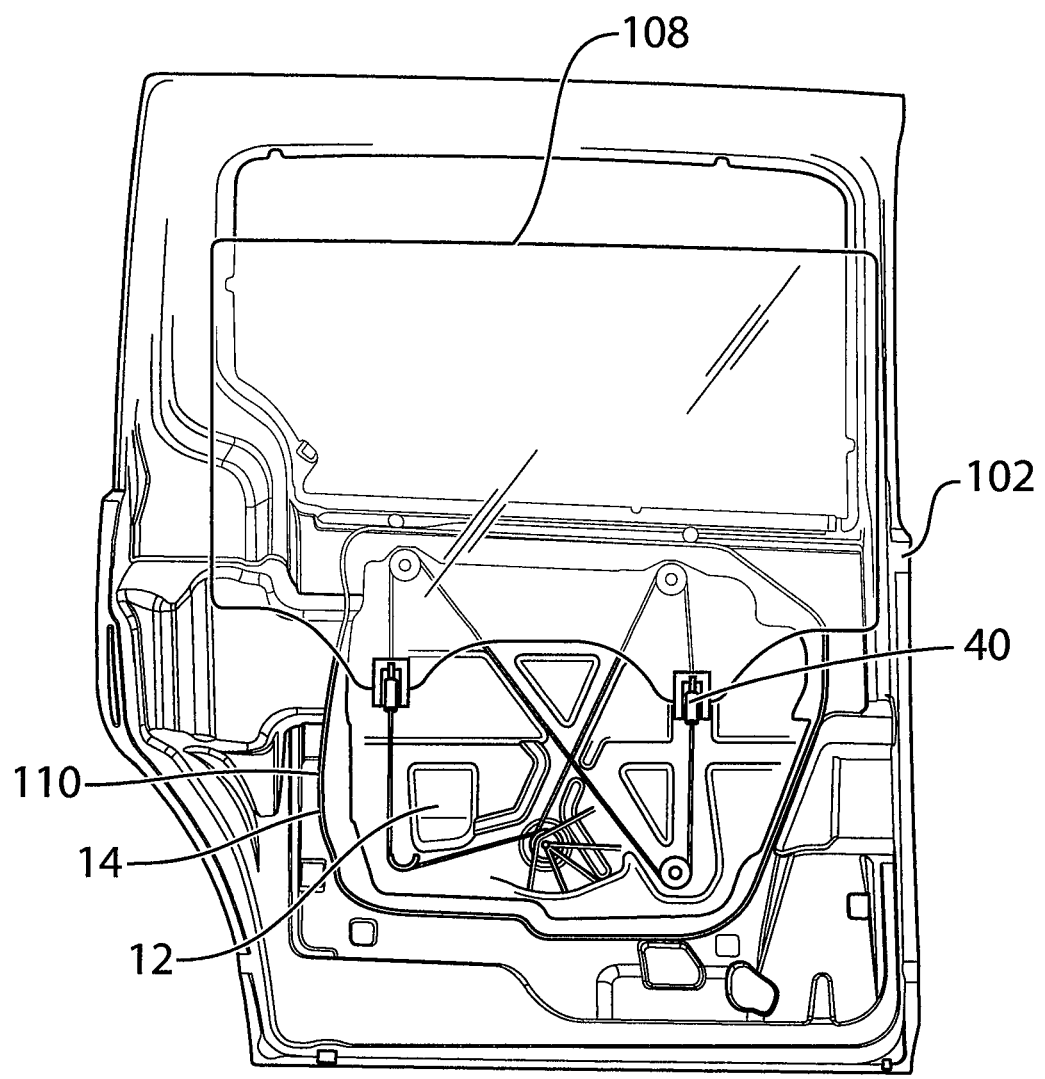
FIG. 10 is a side view, taken from the second side, of the door module shown in FIG. 1 mounted to the inner panel of the vehicle sliding door.

The carrier 12 includes a circumferential sealing bead 14 on the wet side of the carrier 12 that may be provided in any suitable way. For example, if the carrier 12 is injection molded the sealing bead 14 may be co-molded with the carrier 12. As seen best in FIG. 10 the carrier 12 is mounted against the inner door panel 102 with the circumferential sealing bead 14 surrounding the aperture 110. The carrier 12 is substantially impervious to water and once the carrier 12 is mounted the sealing bead 14 is compressed to take up any irregularities in the mating surfaces of the carrier 12 and the inner door panel 102 to substantially prevent the infiltration of moisture into the passenger cabin.

A trim panel (not shown) covers the door module 10 for aesthetic purposes. The trim panel may provide various convenience features such as a map holder, a cup holder and an armrest.

The door module 10 as illustrated in the drawings carries most if not all of the functional door hardware components for the sliding vehicle door 100. The major door hardware components for the sliding vehicle door 100 may include: a window regulator 20, a main door latch 24, a cinching latch 30, an inside handle 34, an electronic control unit (ECU) 36 and a wire harness 38. Depending on the design of the sliding vehicle door 100 the door module 10 may omit one or more of these aforementioned door hardware components or include other or additional door hardware components such as a speaker (not shown). For example, the door module 10 may omit the window regulator 20 in circumstances where the door module 10 is intended for a sliding vehicle door that has a fixed window.

In the door module 10 illustrated in the drawings the carrier 12 functions as an integral part of the window regulator 20 in that the carrier 12 supports and guides operating elements of the window regulator 20. Referring in particular to FIG. 2, the window regulator 20 includes two lift brackets 40 to which the window 108 (see FIG. 10) may be connected after the door module 10 is installed. Examples of suitable lift brackets are disclosed in PCT Publication No. WO2008/138122 entitled "Window Regulator Assembly for a Vehicle", the contents of which are incorporated herein in its entirety, although the door module 10 may use other types of lift brackets. Each lift bracket 40 is guided by a rail track 42 that is integrally molded in the body of the carrier 12. The carrier 12 thus has two rail tracks 42, each of which includes two parallel rails 44 that are positioned within a longitudinal channel 46 provided in the carrier 12. Each lift bracket 40 includes at least one slot or edge (not shown) that interacts with at least one of the rails 44 and is thus guided for movement by at least one of the rails 44. The rail tracks 42 including longitudinal channels 46 may be curve-linear in form, as illustrated, allowing the lift brackets 40 and consequently the window 108 to follow a curve-linear path to match the outer contour of the vehicle.

Figure 7:
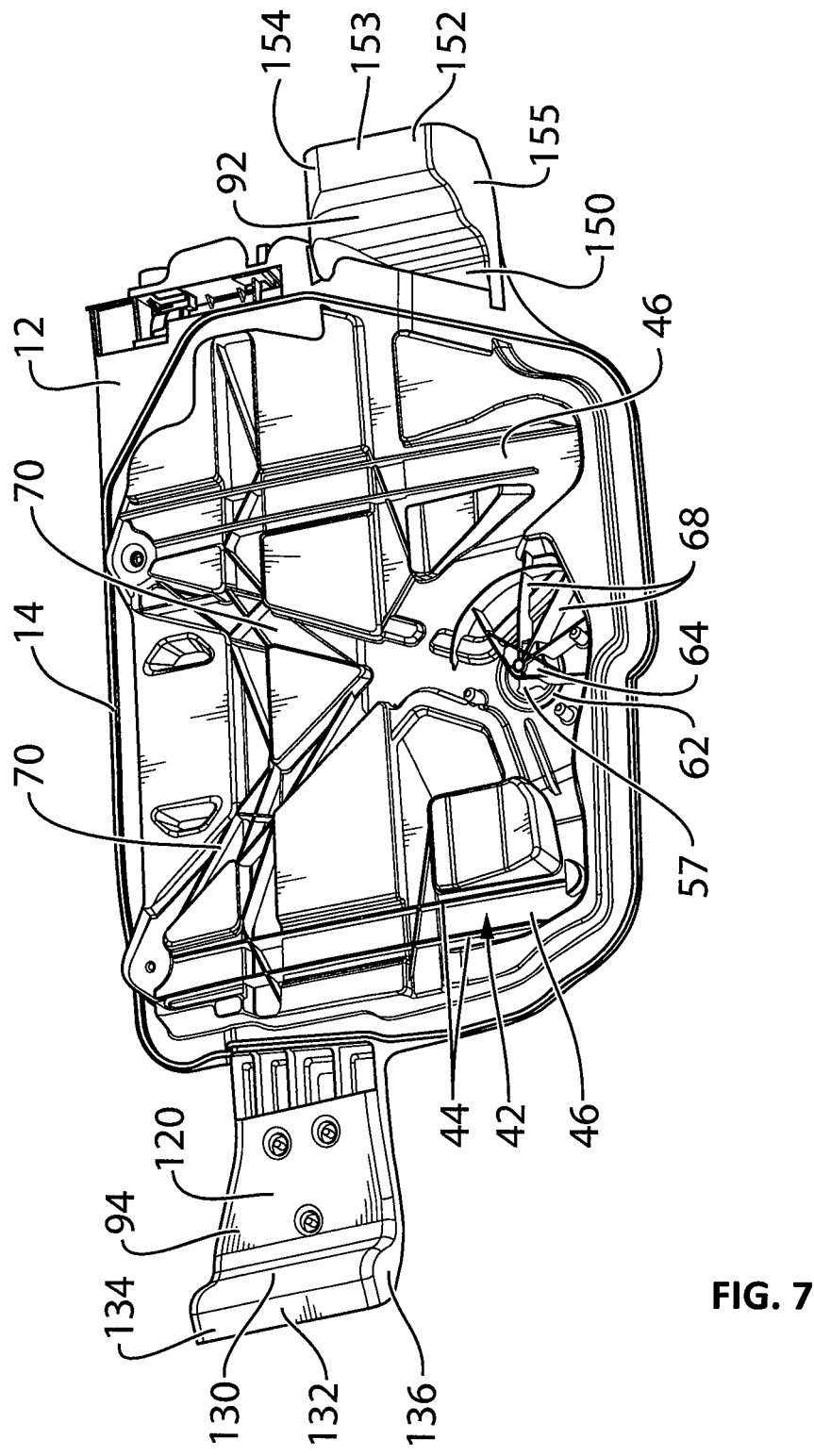
FIG. 7 is a perspective view of the carrier portion of the door module shown in FIG. 1, as seen from the second side of the door module.
Figure 8:
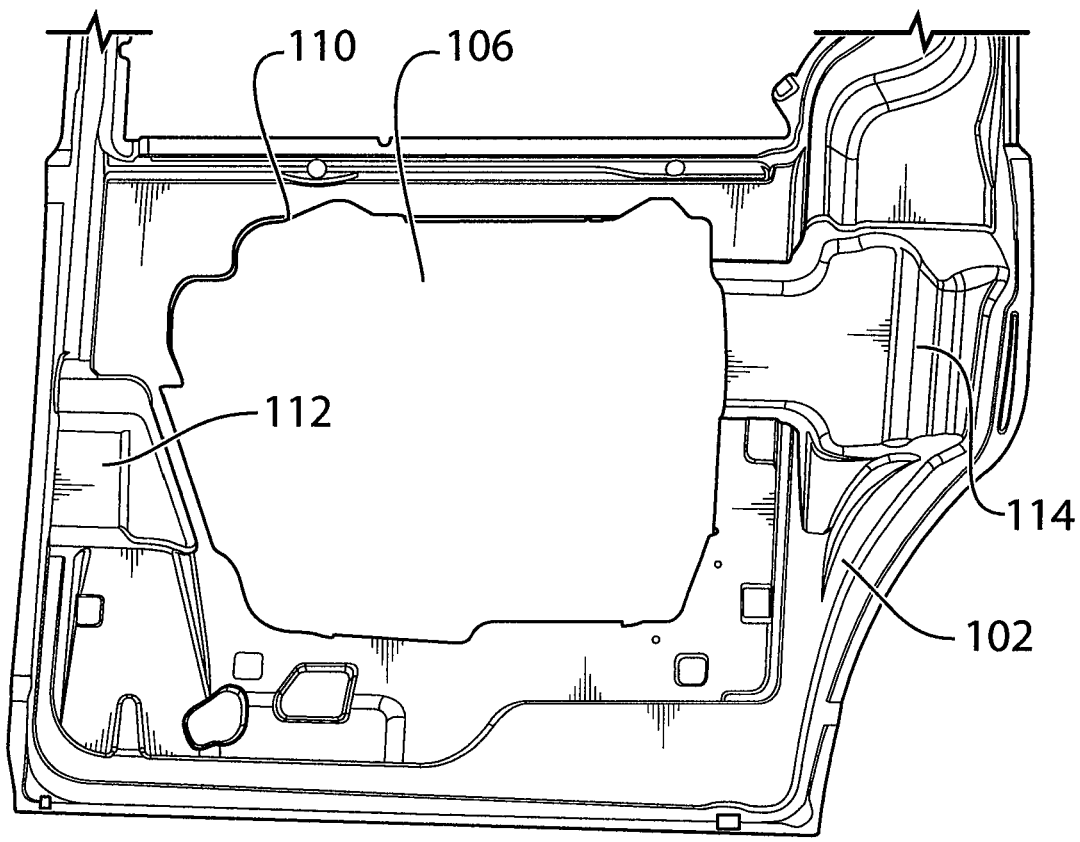
FIG. 8 is a perspective view of the vehicle sliding door shown in FIG. 4.

As seen best in the isolated views of FIGS. 7 and 8, the longitudinal channels 46 may be provided as depressions in the wet side of the carrier 12 and elevations on the dry side of the carrier 12 in order to minimize the overall depth of the door module 10.

With reference to FIGS. 1 and 2, the lift brackets 40 are driven along the rail tracks 42 by a cable drive system 50. The cable drive system 50 includes a wire or cable 52 which is connected to the lift brackets 40 and guided along a drive path by cable guides 54. The cable 52 is connected to a cable drive drum 56, as known in the art, which is mounted for rotation in a nesting mount 58 located on the wet side of the carrier 12. A bidirectional motor 60 is located on the dry side of the carrier 12 and connected to the cable drive drum 56 via a shaft (not shown) which extends through a hole 57 (see FIG. 7) in the carrier 12 to the dry side to interconnect the cable drive drum 56 and motor 60. The motor 60 is controlled by the ECU 36. When the ECU 36 rotates the motor 60 in one directional sense, the cable drive drum 56 is also rotated to tension the cable 52 and the move the lift brackets 40 and window 108 in one direction, and conversely when the ECU reverses the rotation of the motor the lift brackets 40 and window 108 move in the opposite direction.

As seen best in FIG. 7, the nesting mount 58 is provided by a depression 62 and an overhanging web 64 formed in the carrier 12 that cooperate with one another to seat the cable drive drum 56 between the depression 62 and the overhanging web 64. A rivet 66 (see FIG. 2) is installed through the overhanging web 64 to journal the cable drive drum 56 at the wet side of the carrier 12. The overhanging web 64 also includes a series of ribs 68 extending radially from the rivet 66 to increase the stiffness of the overhanging web 64. The window module 10 may utilize other mounting structures.

Figure 6:
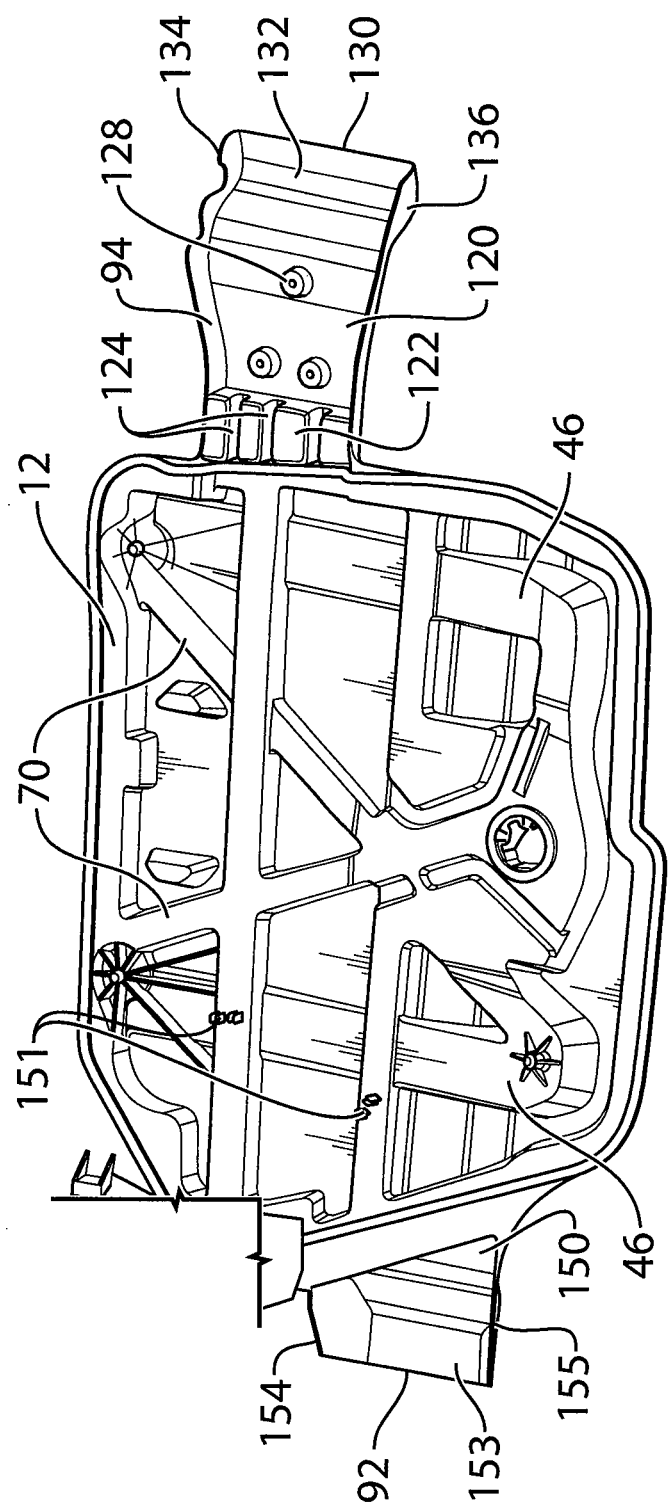
FIG. 6 is a perspective view of a carrier portion of the door module shown in FIG. 1, as seen from the first side of the door module.

The carrier 12 also includes integrally formed cross-channels 70 (see FIGS. 6 and 7) that join with the longitudinal channels 46 allowing the cable 52 to run cleanly through the network of longitudinal channels 46 and cross-channels 70 whilst minimizing the risk of the cable 52 being snared by the window 108 or other portion of the sliding vehicle door 100 as the window 108 moves up or down.

The cable 52 may be unsheathed, as illustrated, and guided entirely by the cable guides 54 such as rotating pulleys 72 or fixed directional guides 74. The illustrated door module 10 includes three pulleys 72 and one fixed guide 74 but the number of pulleys or fixed guides may vary depending on the requirements of the window regulator 20 such as how much damping, if any, is required in the cable drive system 50. The cable 52 may also be a one piece element or formed from multiple segments as known in the art. The cable drive system 50 may also omit one or more of the cable guides 54 and utilize sheathed cable as an alternative technique for routing the cable 52 along one or more legs of the cable drive path.

The fixed cable guides 74 may be formed as an integral part of the carrier 12. The pulleys 72 are separate components which are fastened to the carrier 12 using pulley fasteners 76. As seen in FIG. 2, to move the lift brackets 40 and window 108 upwards the cable drive drum 56 rotates counterclockwise and thus pulley 54B bears high load stress. In order to support the high load this pulley 54B utilizes a conical pulley bearing member 78 which enables the pulley 54B to operate at high load without deforming the carrier 12 as described in PCT Publication No. WO2008/138122. The conical pulley bearing member 78 may be utilized for other pulleys or omitted altogether, and/or other techniques for dealing with loading stresses may be employed depending on the application.

The window regulator 20 as shown in the drawings utilizes a dual rail structure, however it will be noted that the door module 10 may employ a single rail (with single or dual lift brackets) structure or a structure that utilizes more than two rail tracks and/or lift brackets. Likewise, each rail track 42 may have only one rail 44 or include more than two rails 44 depending on the particular configuration of the lift bracket 40 and the manner in which the lift bracket 40 is guided by the rail 44.

To facilitate installation, the door module 10 as illustrated does not incorporate glass run channels for guiding edges of the window 108. Instead, glass run channels 80 are intended to be either integrated in the structure of the sliding vehicle door 100 or mounted separately to the sliding vehicle door as shown in FIG. 5B.

The locking mechanisms connected to the door module 10 include the cinching latch 30 and the main door latch 24. The cinching latch 30 locks the sliding vehicle door 100 when the sliding vehicle door 100 is closed and the cinching latch 30 has a cinching mechanism as known in the art for clinching the sliding vehicle door 100 shut when the sliding vehicle door 100 nears full closure. The main door latch 24 locks the vehicle sliding vehicle door 100 and provides substantial support against opening stresses. The inside handle 34 cooperates with the cinching latch 30 and the main door latch 24 to open the cinching latch 30 and the main door latch 24 and lock the latches 24, 30, depending on the position of the sliding vehicle door 100. In the illustrated door module 10, the window regulator motor 60 also functions to actuate various locking and unlocking levers of the cinching latch 30 and/or the main latch 24 as known in the art and is connected to a distribution plate 84 that controls various cables 88 connected to various levers of the cinching latch 30 and/or the main door latch 24. The ECU 36 is electrically connected to the inside handle 34 and controls the window regulator motor 60 as known in the art in order to selectively tension the cables 88 through the distribution plate 84 as known in the art and effect various opening, closing and/or locking sequences of the sliding vehicle door 100 in response to manipulation of the inside handle 34.

To support the locking mechanisms, the carrier 12 includes an integral handle bracket 90 and front and rear latch presenters 92, 94 that position the cinching latch 30 and main latch 24, respectively, relative to the inner door panel 102 of the sliding vehicle door 100. The latch presenters 92, 94 locate the cinching latch 30 and main latch 24 on the dry side of the carrier 12, and as discussed in greater detail below, enable the cinching latch 30 and the main latch 24 to be easily serviced.

The inner door panel 102 of the sliding vehicle door 100 illustrated in the drawings differs from the conventional in that the inner door panel 102 includes a front pocket 112 at a front edge of the inner door panel 102. The front pocket 112 extends outwards toward the outer door panel 104 and substantially reduces the distance between the inner and outer door panels 102 in the area of the rear pocket 112.

The inner door panel 102 further differs from the conventional in that the inner door panel 102 includes a rear pocket 114 at a rear edge of the inner door panel 102. The rear pocket 114 extends outwards toward the outer door panel 104 and substantially reduce the distance between the inner and outer door panels 102, 104 in the area of the rear pocket 114.

The front and rear pockets 112, 114 may be formed via a deep draw in inner door panel 102 and may be formed through known manufacturing techniques such as progressive die stamping or hydroforming. The pockets 112, 114 are configured to allow the main latch 24 and the cinching latch 30 to be positioned on the dry side even when the strikers or keepers which cooperate with these latches are positioned proximate the outer door panel 104.

Figure 9:
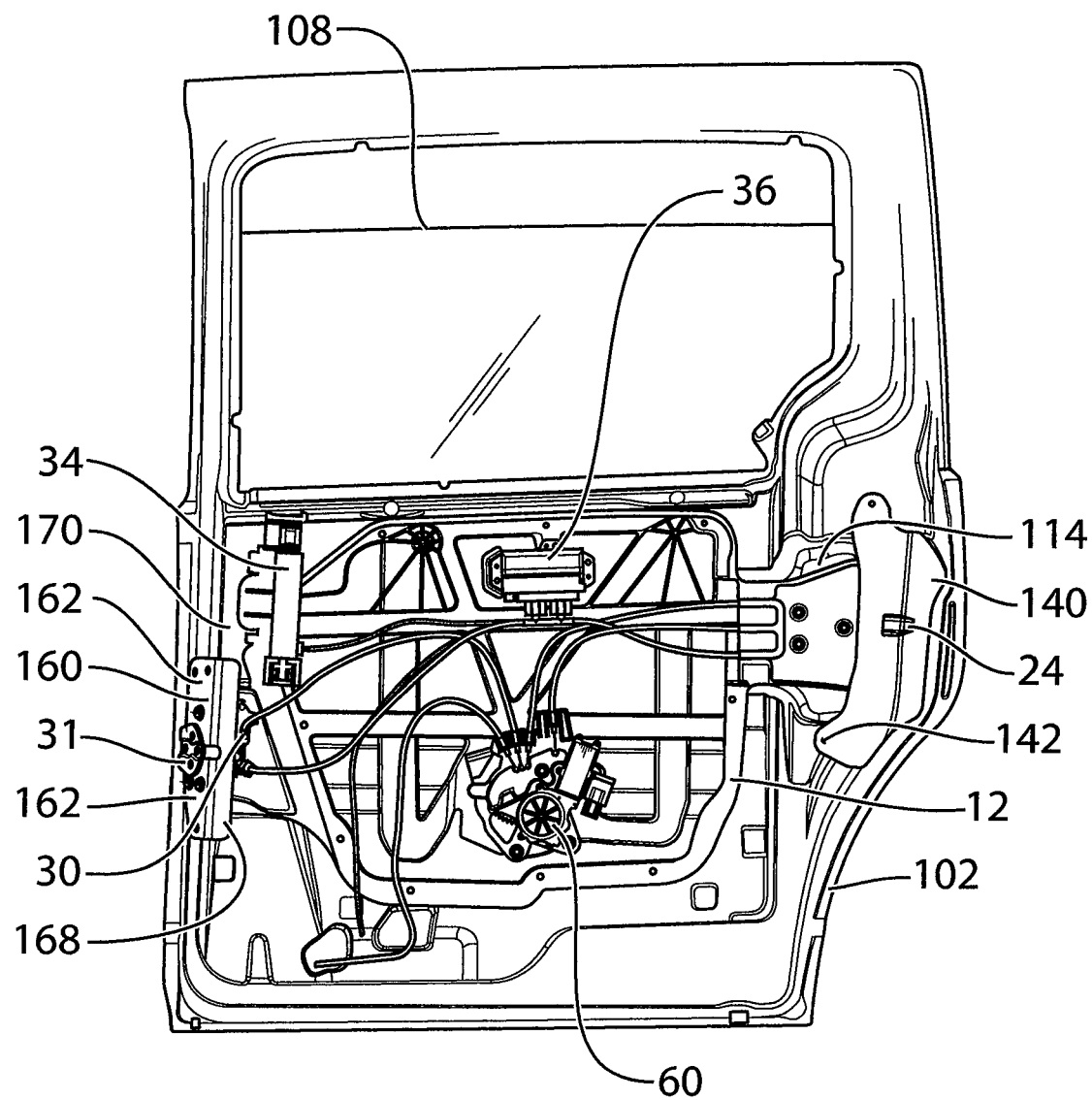
FIG. 9 is a side view, taken from the first side, of the door module shown in FIG. 1 mounted to the inner panel of the vehicle sliding door.

A keeper 31 for cinching latch 30 is shown schematically in FIGS. 1 and 9. In practice the keeper 31 is mounted to a pillar in the vehicle (not shown). The main latch 24 also cooperates with a keeper (not shown) that is mounted to another pillar in the vehicle.

The rear pocket 114 stores the main latch 24 and the rear latch presenter 94 on which the main latch 24 is held on the carrier 12. The rear latch presenter 94 includes a web portion 120 extending rearward form the main body of the carrier 12. The web portion 120 includes an integrated divider 122 that has a flat front surface with a number of latitudinal slots running through the divider 122 for organizing and retaining various mechanical cables and electrical wires leading to the main latch. Yet, the divider 122 maintains an overall flat surface for receiving and supporting the trim panel whilst routing and presenting all the mechanical cables and electrical wires required for the main latch 24 on the dry side of the carrier 12 without having to fish any mechanical cables and/or electrical wires through holes in the carrier.

Figure 3:
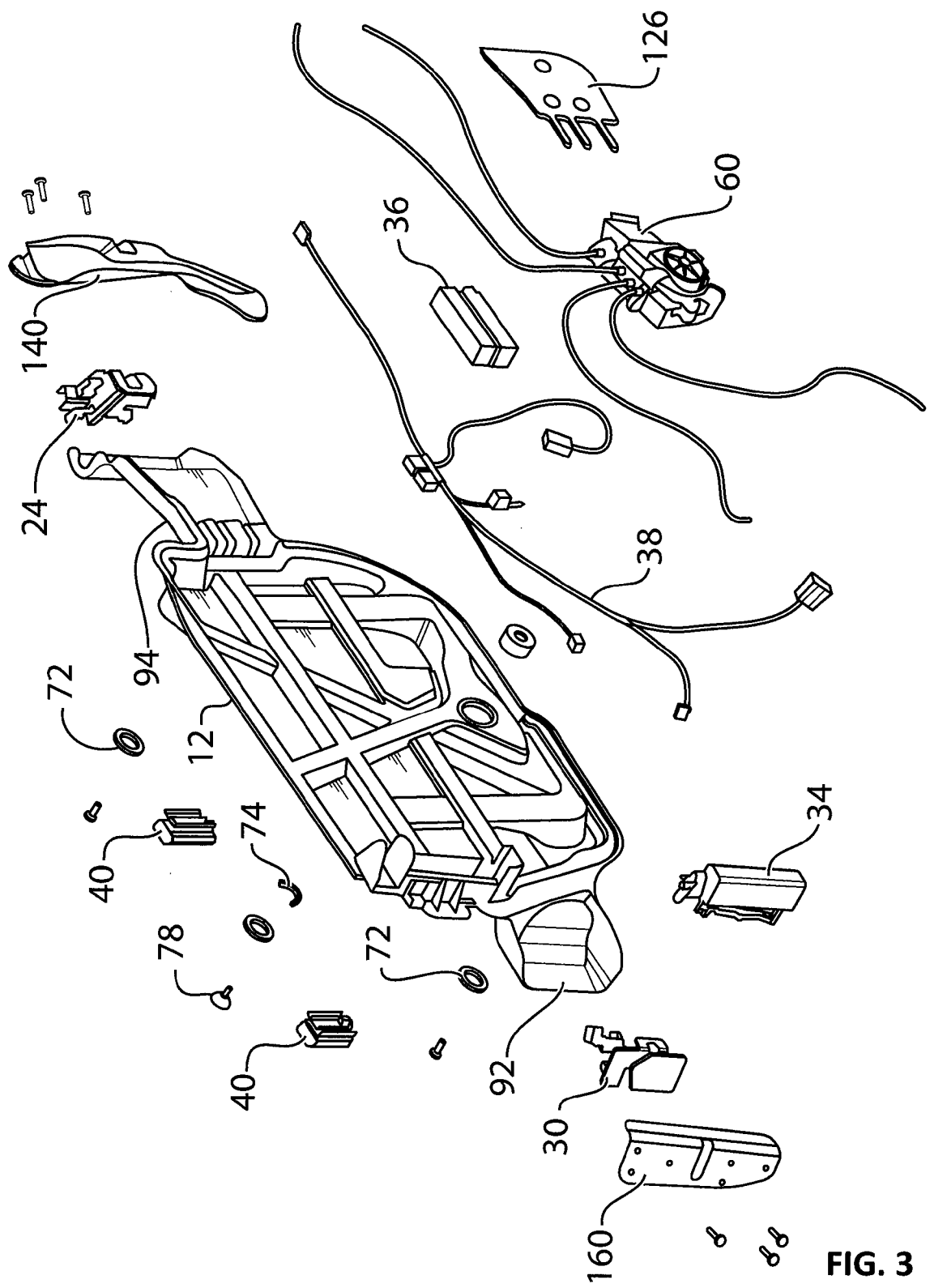
FIG. 3 is an exploded view of the door module shown in FIGS. 1 and 2.
Figure 5A:
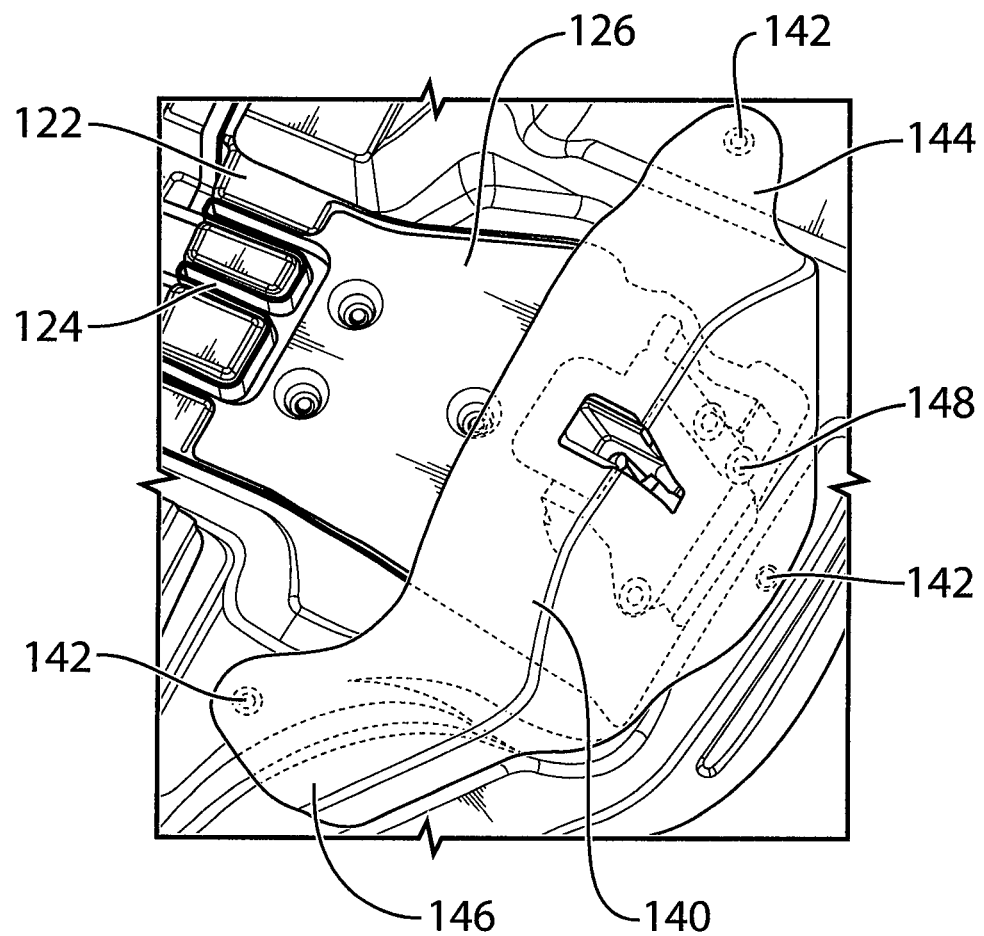
FIG. 5A is a magnified perspective view of a latch portion of the door module shown in FIG. 1.
Figure 5B:
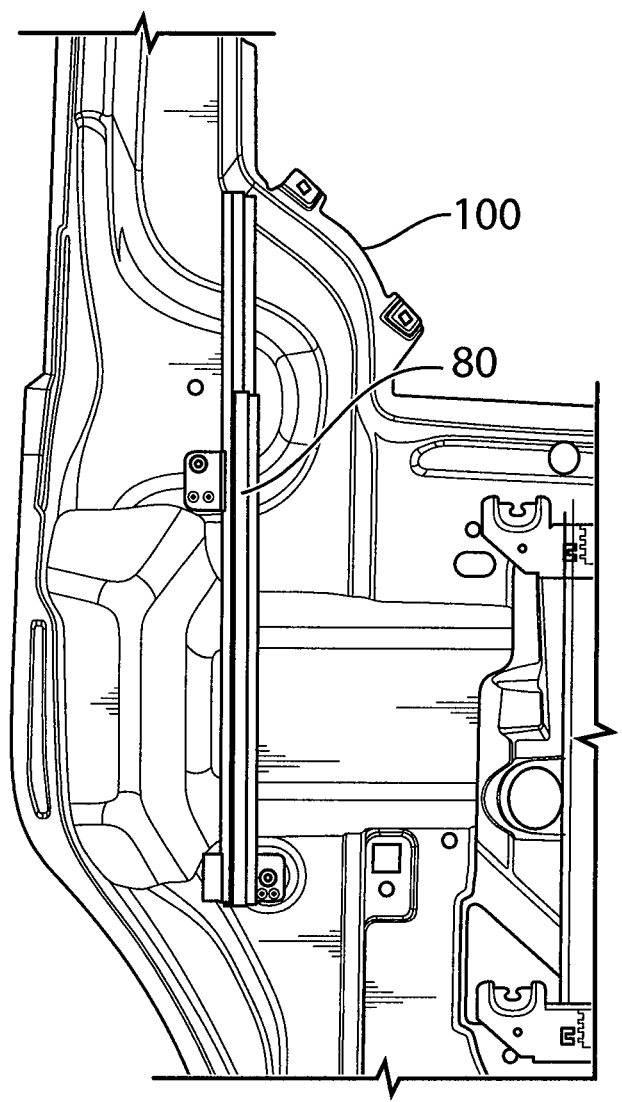
FIG. 5B is a magnified view of a portion of the vehicle sliding door to which a glass run channel is mounted.

As seen best in FIGS. 3 and 5A, a cover plate 126 is attached to the web portion 120 which includes elevated fastener mounts 128 for receiving mounting fasteners.

The web portion 120 of the rear latch presenter 94 transitions into a shroud portion 130 having an outer wall 132 joined to top and bottom walls 134, 136, respectively. The shroud portion 130 form fits into the rear pocket 114 and encapsulates the majority of the outer sides of the main latch 24. The shroud portion 130 thus provides a measure of insulation against the inner sheet layer metal 102 and also inhibits the entry of water to the main latch 24 to protect electrical connections and the like to the main latch 24 thus reducing the need for exhaustive countermeasures that may otherwise be needed to seal latches located in areas where there is exposure to water.

A rear latch reinforcement plate 140 is attached to the main latch 24 and is thus indirectly carried by the door module 10. The rear latch reinforcement plate 140 overlies the cover 126. After the door module 10 is installed, the rear latch reinforcement plate 140 is fastened to the inner door panel 102 with fasteners 142 at a plurality of points about the rear pocket 114. In the illustrated door module, the rear latch reinforcement plate 140 has top, bottom and side wings 144, 146, 148 that are respectively fastened to the inner door panel 102 at points located respectively above, below and to the side of the rear pocket 114. Thus the main latch 24 is not directly mounted to the inner sheet metal layer 102; instead, the rear latch reinforcement plate 140 retains the main latch 24 in the rear pocket 114 and substantially bears the loads that the main latch 24 is subject to such as lateral loads that occur in the event of a crash.

It will be noted that the positions of the fasteners 124 are outside of the pocket 112 and outside of the latch 24 itself (i.e. outside of the occupied volume of the latch 24). Thus, the fasteners 124 spread forces that may be incurred by the latch 24 during a side impact over a larger section of the inner door panel 102 than is occupied by the latch 24 itself. In this way, the vehicle door 100 is better able to withstand the forces incurred during such a side impact. It will further be noted that, by mounting the rear latch reinforcement plate 140 to the inner door panel 102 using three or more fasteners 142 mounted in a way that they are not all collinear (i.e. they are positioned non-colinearly) along the inner door panel 102, the rear latch reinforcement plate 140 is better able to spread forces exerted in any direction. By contrast a latch that is mounted to a door panel using only two fasteners (or three or more fasteners that are collinear) is relatively weak in resisting bending forces or components of bending forces that are exerted in a direction that is perpendicular to a line extending between the fasteners. By spreading the forces as described above, the vehicle door 100 may be made sufficient strong in the area of the latch 24 without the need for a non-removable reinforcement plate mounted (e.g. by welding or the like) to the inner door panel.

Conventionally, vehicle doors typically incorporate reinforcement blanks or gussets about the door hinge and/or latch areas in order to support the stresses about these areas that thin sheet metal is not able to support. In the illustrated sliding vehicle door, the deep draw about the rear pocket 114 may not leave sufficient room for such reinforcements; however, reinforcements (not shown) may be provided in the areas about the latch reinforcement plate fastening points.

Advantageously, the main latch 24 is easily accessible and serviceable from the dry side by removing the trim panel and the rear latch reinforcement plate 140.

A small foam seal or the like (not shown) may be provided on the front latch reinforcement plate 160 around the fishmouth of the cinch latch 30 to further assist in sealing against water infiltration into the cinch latch 30.

The front pocket 112 stores the cinch latch 30 and the front latch presenter 92 on which the cinch latch 30 is held on the carrier 12. The front latch presenter 92 includes a shorter web portion 150 extending forward from the main body of the carrier 12. Clips 151 integrally formed in the carrier 12 hold and organize various cables and electrical wires leading to the cinch latch 30.

The web portion 150 of the front latch presenter 92 transitions into a shroud portion 152 having an outer wall 153 joined to top and bottom walls 154, 155, respectively. The shroud portion 152 form fits to the front pocket 92 and encapsulates the majority of the outer sides of the cinch latch 30. The shroud portion 152 thus provides a measure of insulation against the inner sheet layer metal 102 and also the entry of water into the cinch latch 30 to protect electrical connections and the like to the cinch latch 30 thus reducing the need for exhaustive countermeasures that may otherwise be needed to seal latches located in areas where there is exposure to water.

A front latch reinforcement plate 160 is attached to the cinch latch 30 and is thus indirectly carried by the door module 10. After the door module 10 is installed, the front latch reinforcement plate 160 is fastened to the inner door panel 102 with fasteners 162 (see FIG. 4) at a plurality of points about the front pocket 112. In the illustrated door module 10, the front latch reinforcement plate 160 has top and bottom wings 164, 166 that are respectively fastened to the inner door panel 102 at points located respectively above and below the front pocket 112. The front latch reinforcement plate 160 also includes a side wall 168 for continuing and strengthening a stiffening wall 170 (see FIG. 9) in the inner door panel 102. The cinch latch 30 is also not directly mounted to the inner door panel 102 but is retained in the front pocket 112 by the front latch reinforcement plate 160 which substantially bears the loads that the cinch latch 30 is subject to. In the illustrated sliding vehicle door 100, the deep draw about the front pocket 112 may also not leave sufficient room for tailor blank reinforcements, however, reinforcements (not shown) may be provided in the areas about the latch reinforcement plate fastening points.

The cinch latch 30 is thus also easily accessible and serviceable from the dry side by removing the trim panel and the front latch reinforcement plate 160.

In similar manner to the rear latch reinforcement plate 140, it will be noted that the positions of the fasteners 162 are outside of the pocket 112 and outside the occupied volume of the cinch latch 30 itself. Thus, the fasteners 162 spread forces that may be incurred by the cinch latch 30 during a side impact over a larger section of the inner door panel 102 than is occupied by the cinch latch 30 itself. In this way, the vehicle door 100 is better able to withstand the forces incurred during such a side impact. Also in similar manner to the rear latch reinforcement plate 140, it will further be noted that the front latch reinforcement plate 160 is mounted to the inner door panel 102 using three or more fasteners 162 mounted in a way that they are not all collinear (i.e. they are positioned non-colinearly) along the inner door panel 102. By spreading the forces as described above, the vehicle door 100 may be made sufficient strong in the area of the cinch latch 30 without the need for a non-removable reinforcement plate mounted (e.g. by welding or the like) to the inner door panel.

A small foam seal or the like (not shown) may be provided on the front latch reinforcement plate 160 around the fishmouth of the cinch latch 30 to further assist in sealing against water infiltration into the cinch latch 30.

Some of the advantages and features described above are applicable to both sliding vehicle doors and to hinged vehicle doors (such as the doors on a coupe or sedan). For example, mounting a latch reinforcement plate of either the front or rear latch 24 or 30 outside of the latch 24 or 30 itself is advantageous whether on a hinged vehicle door or on a sliding vehicle door, and would be advantageous regardless of whether a vehicle door had one or two latches, and, on vehicle doors that include front and rear latches would be advantageous whether the latch reinforcement plate is mounted outside of the front latch or whether the latch reinforcement plate is mounted outside the rear latch.

It will be noted that, by providing a latch reinforcement plate such as plate 140 or 160, which covers a latch, such as latch 24 or latch 30, and by providing the latch 24 or 30 on the dry side of the carrier 12 the latch presenters 92 or 94 may be provided on the dry side of the carrier 12 and may be made from a polymeric material, and may easily be molded as one piece with the main portion of the carrier 12, shown at 172. By contrast carriers where the latches are provided on the wet side and where latch reinforcement plates such as those shown and described herein are not provided may not easily be provided from a polymeric material and may not easily be molded with a main portion of the carrier if it is desired to keep the carrier on the inboard side of the inner door panel, due to the complexity of the shape of the carrier and latch presenter.

While the above description constitutes specific examples, these examples are susceptible to further modification and change without departing from the fair meaning of the accompanying claims.

I claim:

1. A sliding vehicle door, comprising:
   an outer door panel;
   an inner door panel joined to the outer door panel so as to define a door cavity between the inner and outer door panels, the inner door panel having an aperture providing access to the door cavity; and
   a door module including a carrier carrying a plurality of functional door hardware components, wherein the door module is mounted to the inner door panel to seal the aperture, the carrier defining a wet side of the door module facing towards the door cavity and a dry side of the door module facing away from the door cavity,
   wherein the inner door panel includes a front pocket positioned adjacent a front edge of the inner door panel and extending towards the outer door panel;
   wherein the inner door panel includes a rear pocket positioned adjacent a rear edge of the inner door panel and extending towards the outer door panel,
   wherein the carrier includes a front latch presenter positioned to at least partially seat in the front pocket, the front latch presenter includes a front latch presenter shroud having an outer wall and top and bottom walls, the front latch is positioned on the front latch presenter such that the shroud outer wall lies between the front latch and the inner door panel front pocket,
   wherein the carrier includes a rear latch presenter positioned to at least partially seat in the rear pocket,
   wherein the door module includes a front latch carried by the front latch presenter on the dry side of the door module so as to be at least partially seated in the front pocket,
   wherein the door module includes a rear latch carried by the rear latch presenter on the dry side of the door module so as to be at least partially seated in the rear pocket.

2. A sliding vehicle door as claimed in claim 1, wherein the front latch presenter shroud inhibits the entry of water into the front latch and electrical connections are made to the front latch within the front latch presenter shroud.

3. A sliding vehicle door as claimed in any one of claim 1, wherein the front latch presenter is integrally formed with the carrier.

4. A sliding vehicle door as claimed in any one of claim 1, wherein the rear latch presenter includes a rear latch presenter shroud having an outer wall and top and bottom walls, and wherein the rear latch is positioned on the rear latch presenter such that the shroud outer wall lies between the rear latch and the inner door panel rear pocket.

5. A sliding vehicle door as claimed in claim 4, wherein the rear latch presenter shroud inhibits the entry of water into the rear latch and electrical connections are made to the rear latch within the rear latch presenter shroud.

6. A sliding vehicle door as claimed in claim 5, wherein the rear latch presenter is integrally formed with the carrier.

7. A sliding vehicle door as claimed in any one of claim 1, including a front latch reinforcement plate connected to the front latch, and wherein the front latch reinforcement plate is connected to the inner door panel by a plurality of fasteners at positions outside of the front latch.

8. A sliding vehicle door as claimed in claim 7, wherein the front latch reinforcement plate includes a first wall and an adjoining side wall transversely oriented to the first wall, and wherein the inner door panel includes a longitudinal wall that is supported by the front latch reinforcement plate side wall.

9. A sliding vehicle door as claimed in any one of claim 1, including a rear latch reinforcement plate connected to the rear latch, and wherein the rear latch reinforcement plate is connected to the inner door panel by a plurality of fasteners at positions outside of the rear latch.

10. A sliding vehicle door as claimed in claim 9, wherein the rear latch reinforcement plate includes top, bottom and side wings that respectively attach to points above, below and to the side of the rear pocket.

11. A sliding vehicle door as claimed in any one of claim 1, wherein at least one of the front and rear latch presenters includes slots positioned on the dry side of the door module for routing at least one cable or wire connected to the latch carried by the at least one of the front and rear latch presenters.

12. A sliding vehicle door as claimed in claim 11, wherein the at least one of the front and rear latch presenters includes a web portion along which the at least one cable or wire travels along the dry side of the door module, and a cover covers the web portion.

13. A sliding vehicle door as claimed in any one of claim 1, including an inside handle mounted to the dry side of the carrier and operatively connected to the front and rear latches.

14. A sliding vehicle door as claimed in any one of claim 1, wherein at least one of the front and rear latches is a cinching latch.

15. A sliding vehicle door as claimed in any one of claim 1, wherein the door module includes a window regulator including drive cable and a cable drum positioned on the wet side of the carrier and a motor positioned on the dry side of the carrier and operatively connected to the cable drum through an aperture in the carrier.

16. A sliding vehicle door according to claim 15, wherein the wet side of the carrier incorporates a network of channels in which the drive cable runs.

17. A sliding vehicle door according to claim 16, wherein the window regulator includes at least one lift bracket connected to the drive cable and the wet side of the carrier includes at least one integrally formed rail guiding the at least one lift bracket.

18. A sliding vehicle door as claimed in claim 15, including at least one glass run channel mounted to the inner door panel for guiding edges of a window.

\* \* \* \* \*